(12) United States Patent
Cattoor et al.

(10) Patent No.: US 12,209,624 B2
(45) Date of Patent: Jan. 28, 2025

(54) METHOD AND SYSTEMS FOR A CLUTCH OF AN ELECTRIC DRIVETRAIN

(71) Applicant: Dana Belgium N.V., Flanders (BE)

(72) Inventors: Kurt Cattoor, Koolkerke (BE); Filip D. Schacht, Meulebeke (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/330,242

(22) Filed: Jun. 6, 2023

(65) Prior Publication Data

US 2024/0410430 A1    Dec. 12, 2024

(51) Int. Cl.
| | |
|---|---|
| *F16D 47/04* | (2006.01) |
| *F16D 13/74* | (2006.01) |
| *F16D 25/0635* | (2006.01) |
| *H02K 7/108* | (2006.01) |
| *H02K 7/116* | (2006.01) |

(52) U.S. Cl.
CPC ............ *F16D 47/04* (2013.01); *F16D 13/74* (2013.01); *F16D 25/0635* (2013.01); *H02K 7/108* (2013.01); *H02K 7/116* (2013.01)

(58) Field of Classification Search
CPC ...... F16D 47/04; F16D 13/74; F16D 25/0635; H02K 7/108; H02K 7/116
See application file for complete search history.

(56) References Cited

U.S. PATENT DOCUMENTS

| | | | |
|---|---|---|---|
| 2,950,630 A | | 8/1960 | Zeidler |
| 3,251,442 A | * | 5/1966 | Aschauer ................. F16D 47/04 |
| | | | 192/85.61 |
| 7,686,730 B2 | | 3/2010 | Baldwin |
| 8,464,852 B2 | | 6/2013 | Simon et al. |
| 9,546,729 B2 | | 1/2017 | Bird et al. |
| 2007/0272508 A1 | | 11/2007 | Toya et al. |
| 2008/0121447 A1 | | 5/2008 | Lang et al. |
| 2009/0088289 A1 | | 4/2009 | Baldwin |
| 2016/0341289 A1 | | 11/2016 | Kato et al. |

FOREIGN PATENT DOCUMENTS

| | | | | |
|---|---|---|---|---|
| CN | 114110154 A | * | 3/2022 | ......... F16H 61/0206 |
| DE | 102019100970 A1 | | 7/2020 | |
| KR | 20200047092 A | | 5/2020 | |

OTHER PUBLICATIONS

English Translation of CN-114110154-A (Year: 2022).*

* cited by examiner

*Primary Examiner* — Victor L MacArthur
(74) *Attorney, Agent, or Firm* — McCoy Russell LLP

(57) ABSTRACT

Systems and a method for a clutch assembly are provided. In one example, a wet clutch for an electric motor includes a plurality of friction plates connected to a clutch hub; a plurality of separator plates connected to a drum and interleaved with the plurality of friction plates, a gear coupled to the electric motor; and a one-way clutch integrated into the wet clutch so as to be positioned between the gear and the clutch hub to allow free rotation in a predetermined direction while the wet clutch is hydraulically actuated and the friction plates and the separator plates rotate at the same speed thus avoiding drag losses.

18 Claims, 10 Drawing Sheets

METHOD AND SYSTEMS FOR A CLUTCH OF AN ELECTRIC DRIVETRAIN

TECHNICAL FIELD

The present description relates generally to a wet clutch including a one-way clutch integrally arranged therein for controlling a speed differential across the wet clutch based on conditions of an electric motor.

BACKGROUND AND SUMMARY

Vehicles, including fully electric vehicles (EVs) and hybrid electric vehicles, may use electric machines to generate torque and power wheels of the vehicles. The electric machine may be included in an electric drivetrain, which may further include a transmission, a drive shaft, a drive axle, and one or more clutches for controlling torque from the electric machine to the wheels and other components therebetween.

Electric machines may produce a greater rotational speed compared to other forms of prime movers, such as internal combustion engines (ICEs). The greater rotational speeds may create greater differences in relative speed between the output of the electric machine and the shafts, gears, clutch (es) and other rotational components of the transmission. For example, a speed differential across a clutch may be increased when included in the electric drivetrain compared to a non-electric drivetrain. The increased speed differential may produce substantially higher temperatures from friction and drag energy to a clutch pack compared to a lower speed differential. These conditions may result in increased wear and reduce longevity of the clutch.

The inventors herein have recognized these and other issues with such systems and have come up with a way to at least partially solve them. In one example, a wet clutch for an electric motor including a plurality of friction plates connected to a clutch hub, a plurality of separator plates connected to a drum and interleaved with the plurality of friction plates, a gear coupled to the electric motor, and a one-way clutch integrated into the wet clutch. In this way, the one-way clutch may control a speed differential across the wet clutch during certain conditions of the electric motor, which may avoid drag losses and increased temperature differentials.

As an example, the one-way clutch may control torque transfer between the gear and the hub of the wet clutch based on operation of the electric motor. The wet-clutch may further include various lubricating passages in a shaft on which the wet clutch is arranged. The lubricating passages may promote lubricant flow to various portions of the wet clutch. By doing this, the one-way clutch may control speed differentials across the wet clutch based on an operation of the electric machine while a desired lubrication of the wet clutch components is maintained in a single, compact package.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and a method for a clutch assembly and related systems. The clutch assembly may include a plurality of clutches configured to selectively couple or decouple two or more components based on operating parameters. As will be described in greater detail herein, the clutch assembly may include a wet clutch with a one-way clutch integrally arranged therein to control a coupling or decoupling of a gear and a hub of the wet clutch. The integration of the one-way clutch may enhance operation of the wet clutch and extend a longevity thereof.

The one-way clutch may be a roller bearing like device which may transfer torque from an input in a first direction and allow free rotation in a second direction, the second direction opposite the first. The input to the one-way clutch may be provided by the gear of the wet clutch. It will be appreciated that the wet clutch may be a dry clutch without departing from the scope of the present disclosure.

The clutch pack of the wet clutch may include a plurality of separator plates and a plurality of frictional plates for coupling or decoupling the hub of the wet clutch from a shaft. Positions of the plurality of separator plates and the plurality of frictional plates may be adjusted based on a pressure of fluid acting upon a piston. The fluid may be lubricant, in one example. The pressure of the fluid may be adjusted passively based on operating conditions of the electric drivetrain. Additionally or alternatively, a pump may be operated to adjust the pressure of the fluid in response to operating conditions of the electric drivetrain. The piston may be coupled to a spring, such that a fluid pressure less than a spring force may result in the piston being actuated by the spring to an open position (e.g., a resting position) where the hub is decoupled from a drum of the shaft.

In one example, the disclosure provides support for a clutch of an electric drivetrain configured to open in response to conditions that may generate a high speed differential across components of the clutch. In one example, a wet clutch comprises a one-way clutch arranged between a first rotational element and a second rotational element, wherein the one-way clutch is closed in response to a speed of the first rotational element being greater than a speed of the second rotational element by a threshold amount. The one-way clutch may close when actuated in a free spinning direction, which may be based on a direction of rotation of the first rotational element. In one example, the first rotational element is a gear and the second rotational element is a hub.

Figure 1:
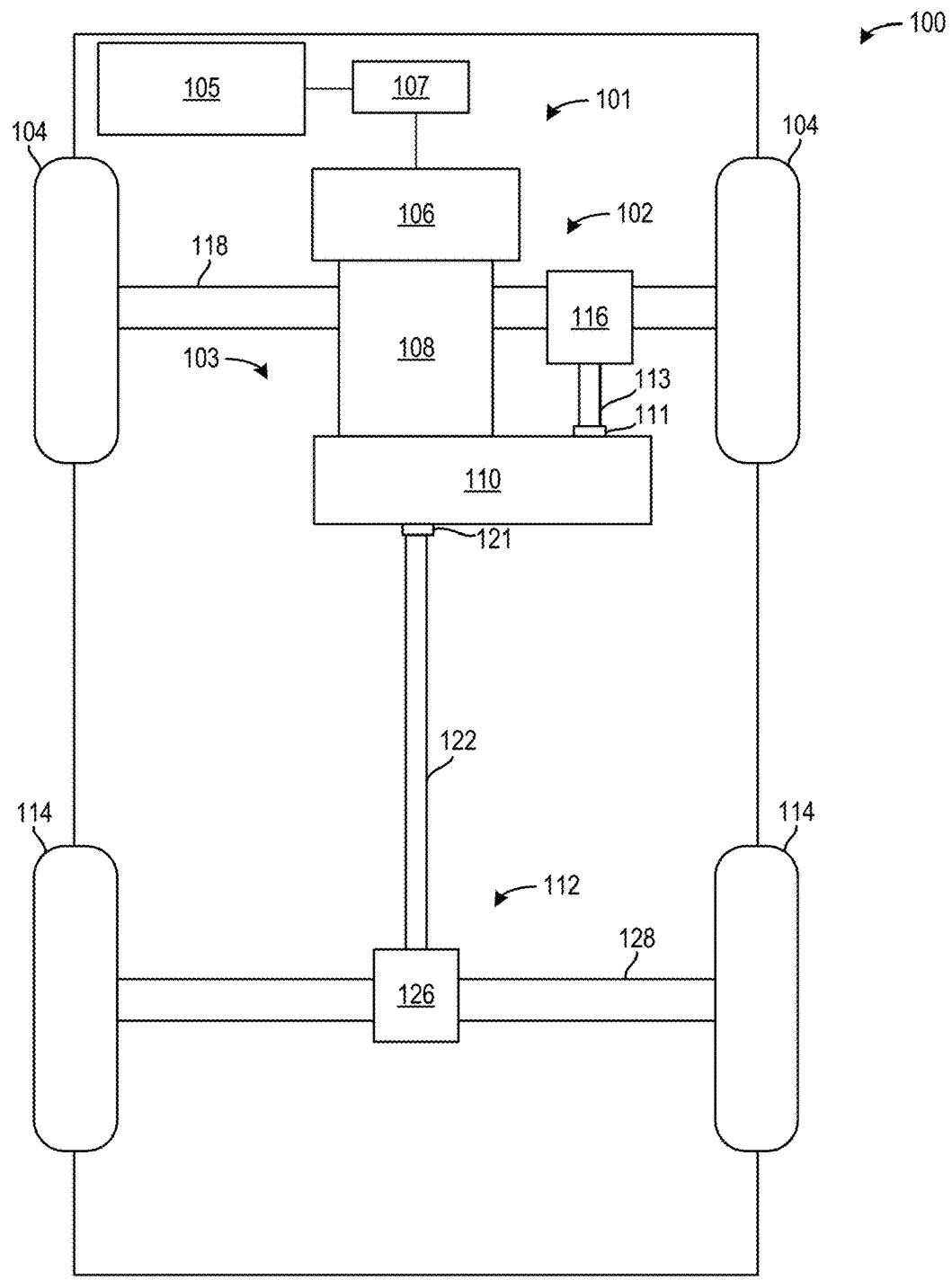
FIG. 1 shows an example schematic of a vehicle which may include a present disclosure gearbox as part of the transmission.
Figure 2:
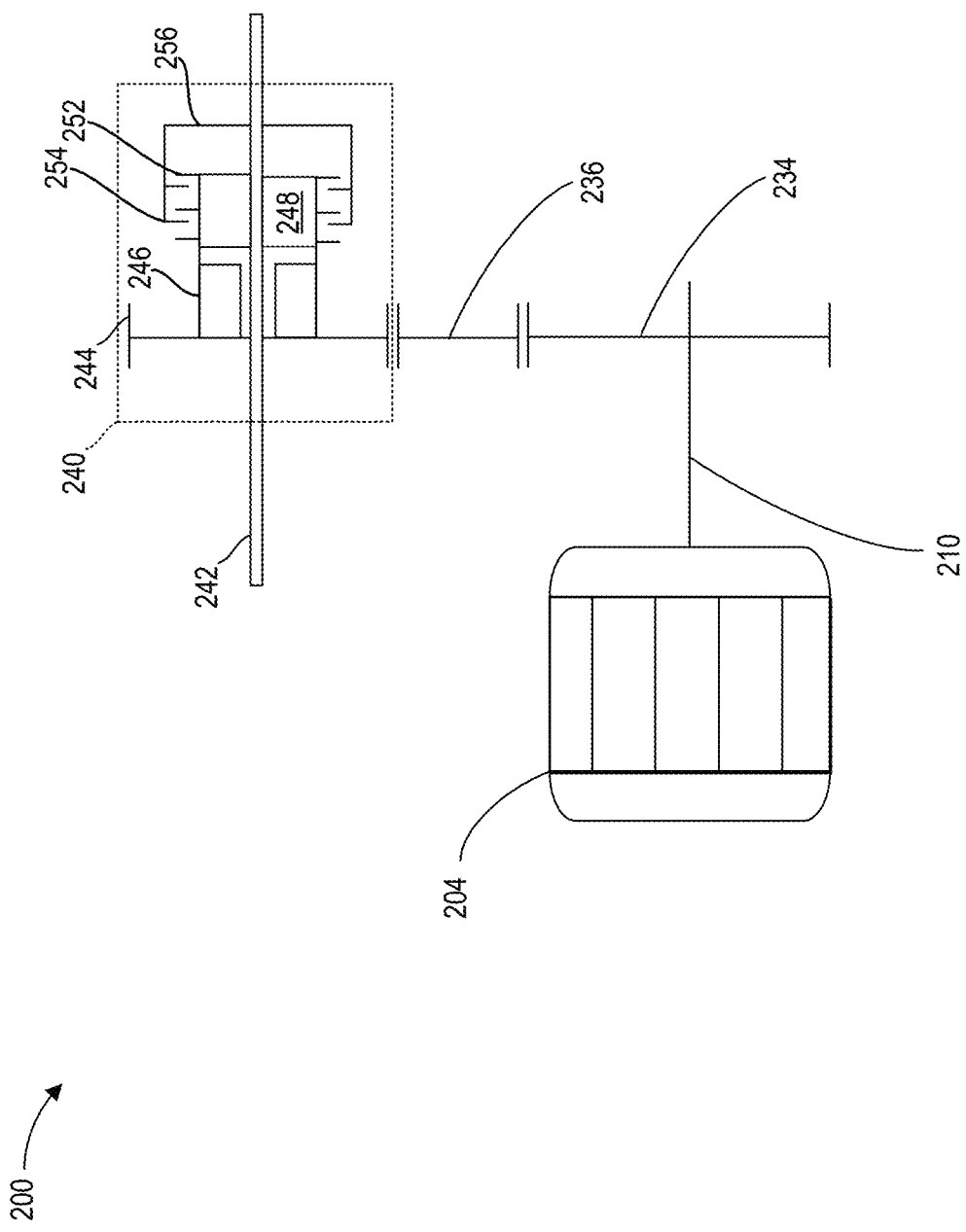
FIG. 2 shows an example of an electric drivetrain, according to an embodiment of the present disclosure.

FIG. 1 shows an example schematic of a vehicle which may include a present disclosure gearbox as part of the transmission. FIG. 2 shows an example of a portion of an electric drivetrain including an electric motor and a clutch.

Figure 3:
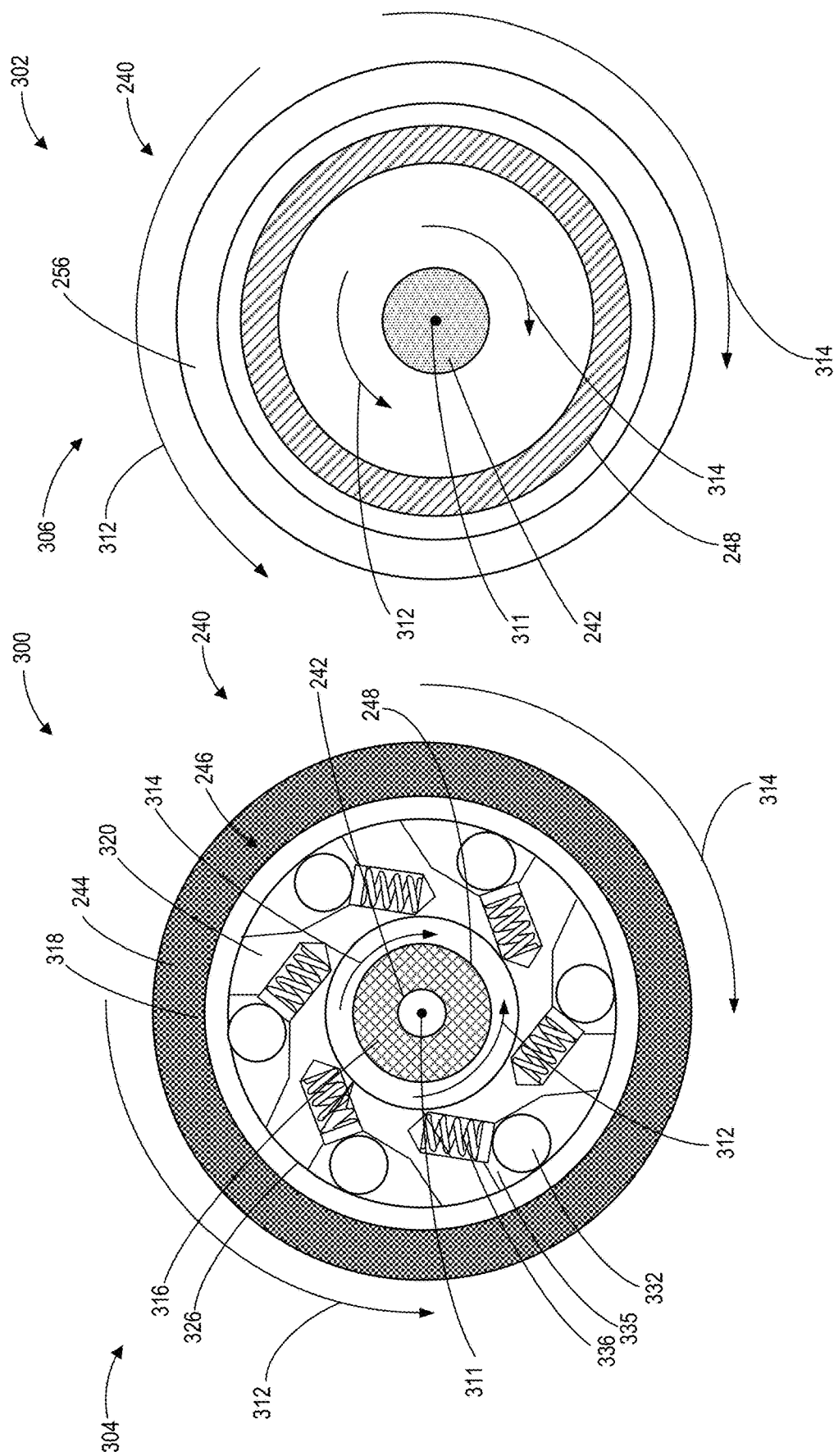
FIG. 3A shows a first sectional view and schematic of a clutch of the electric drivetrain of FIG. 2.
FIG. 3B shows a second sectional view and schematic of the clutch of the electric drivetrain of FIG. 2.
Figure 4:
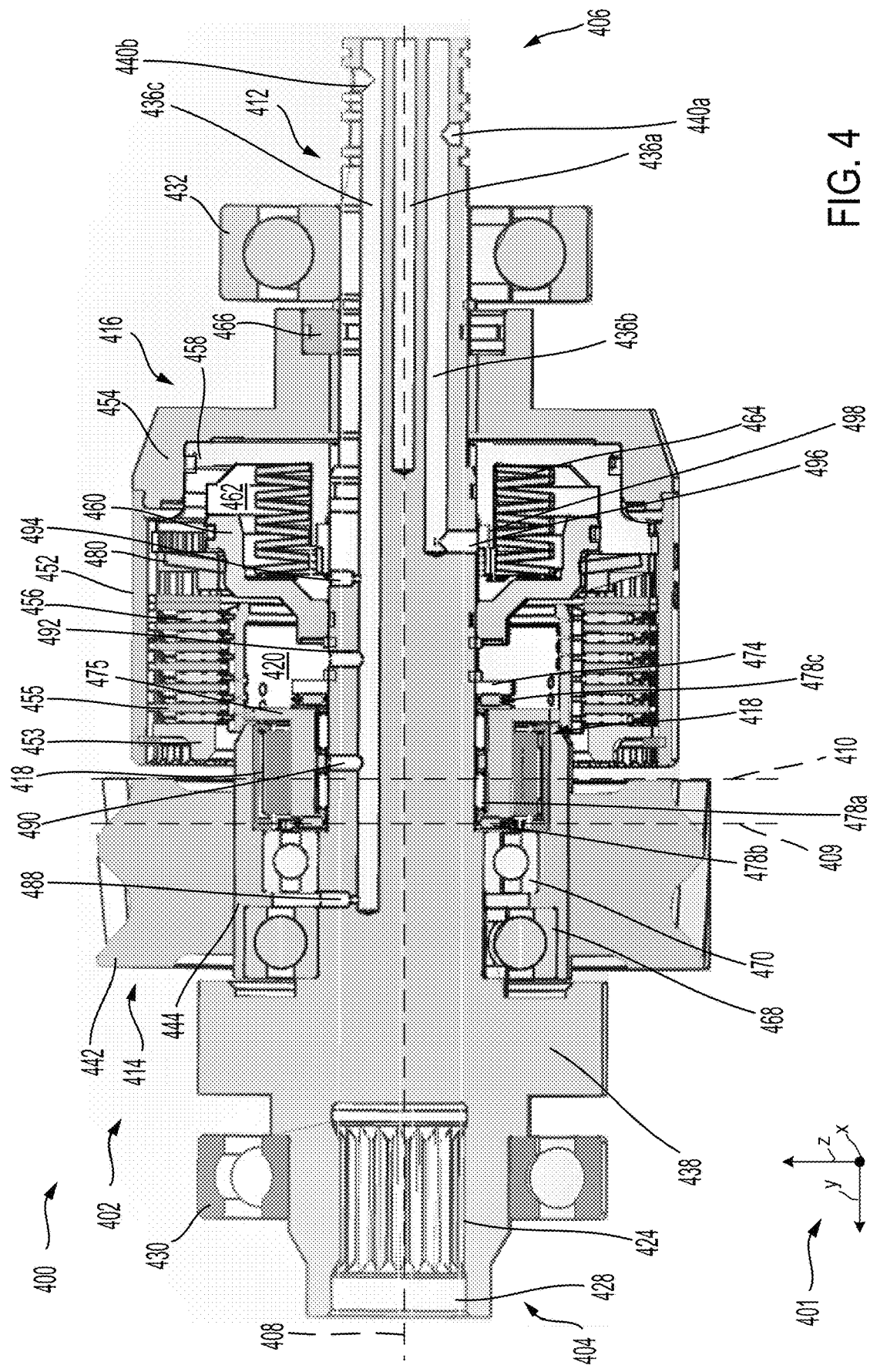
FIG. 4 shows a first sectional view of an assembly of a first clutch and a second clutch.
Figure 5:
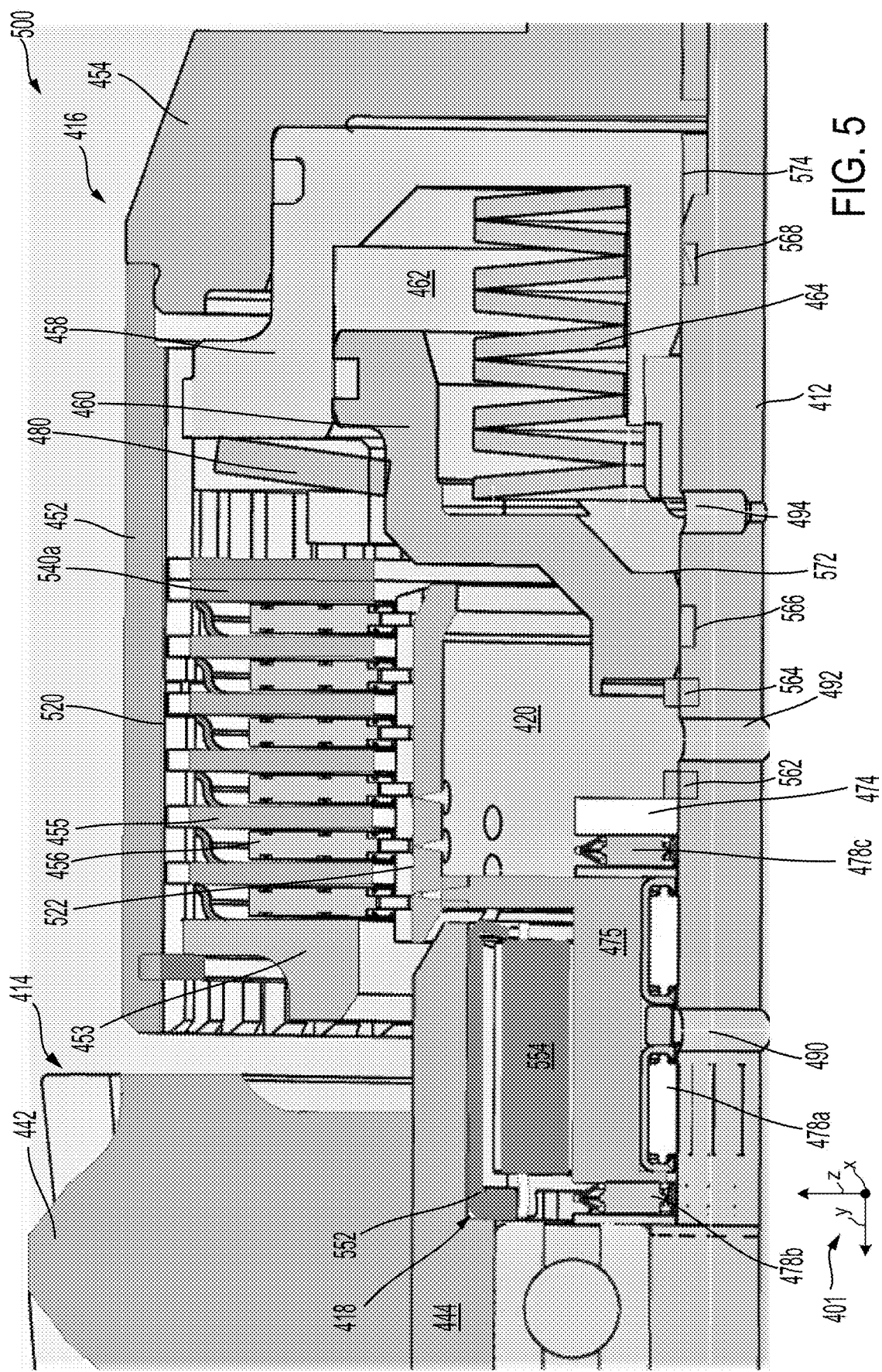
FIG. 5 shows a second sectional view of a section of the assembly of FIG. 4.
Figure 6:
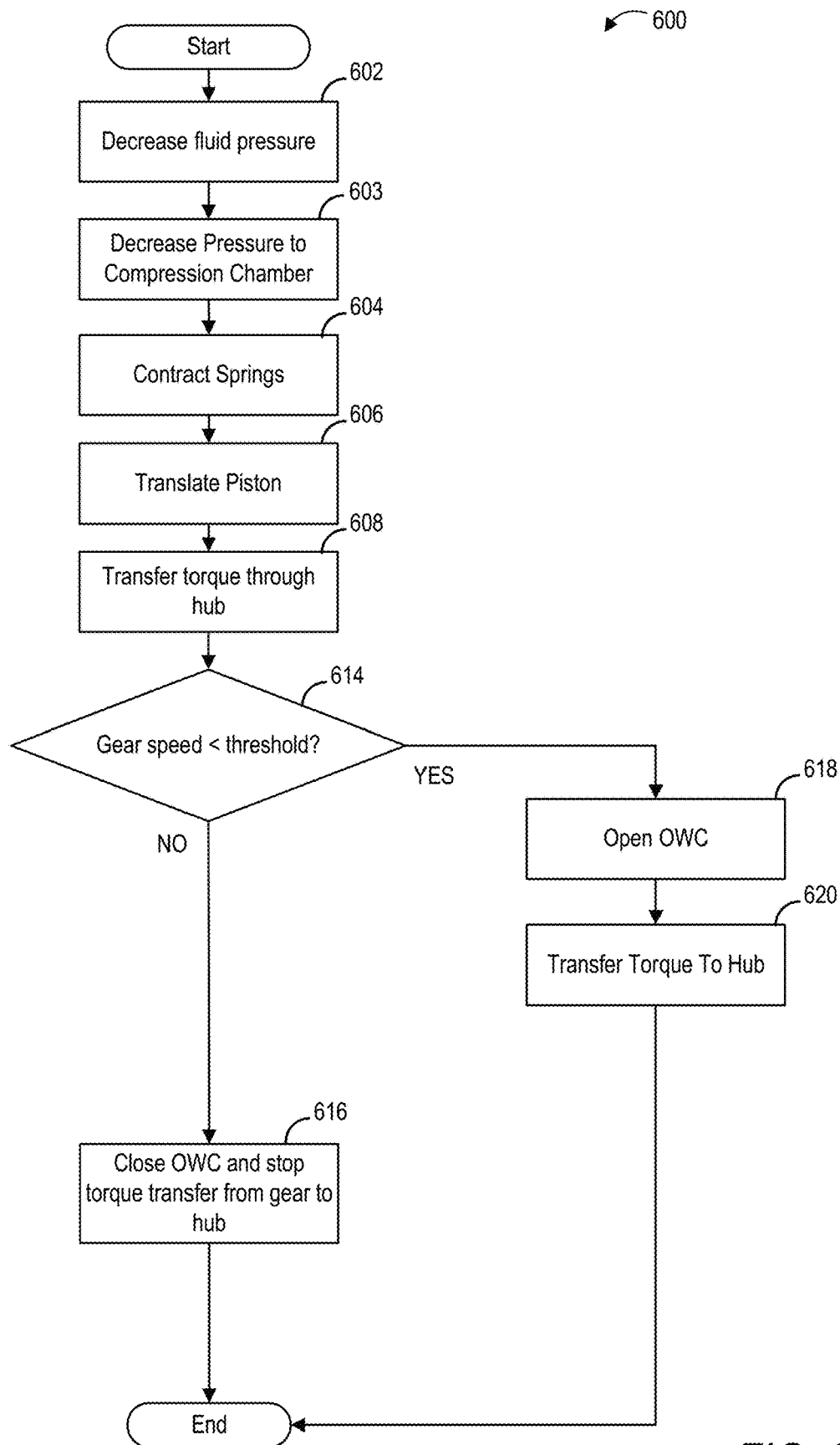
FIG. 6 shows a method for engaging the first and second clutches of the assembly of FIG. 4.

FIG. 3A shows a first sectional view and schematic of a clutch system of the electric drivetrain FIG. 2. FIG. 3B shows a second sectional view and schematic of the clutch system of FIG. 2. FIG. 3A may show how components such as a gear, a one-way clutch, a hub, and a shaft may rotate relative to and lock with one another. FIG. 3B may show how components such a wet clutch, a hub, and a shaft may rotate relative to and lock with one another. FIG. 4 shows a first sectional view of an assembly of a first clutch and a second clutch assembled. The first clutch is a one-way clutch and the second clutch is a wet clutch that share a hub. The assembly may be an embodiment of the clutch system of FIG. 2. FIG. 5 shows a second sectional view of a section of the assembly of FIG. 4. FIGS. 4-5 show sectional views of an embodiment of the assembly and one-way clutch of the present disclosure. FIG. 6 shows a method for engaging the first and second clutches of the assembly of FIG. 4.

Figure 7:
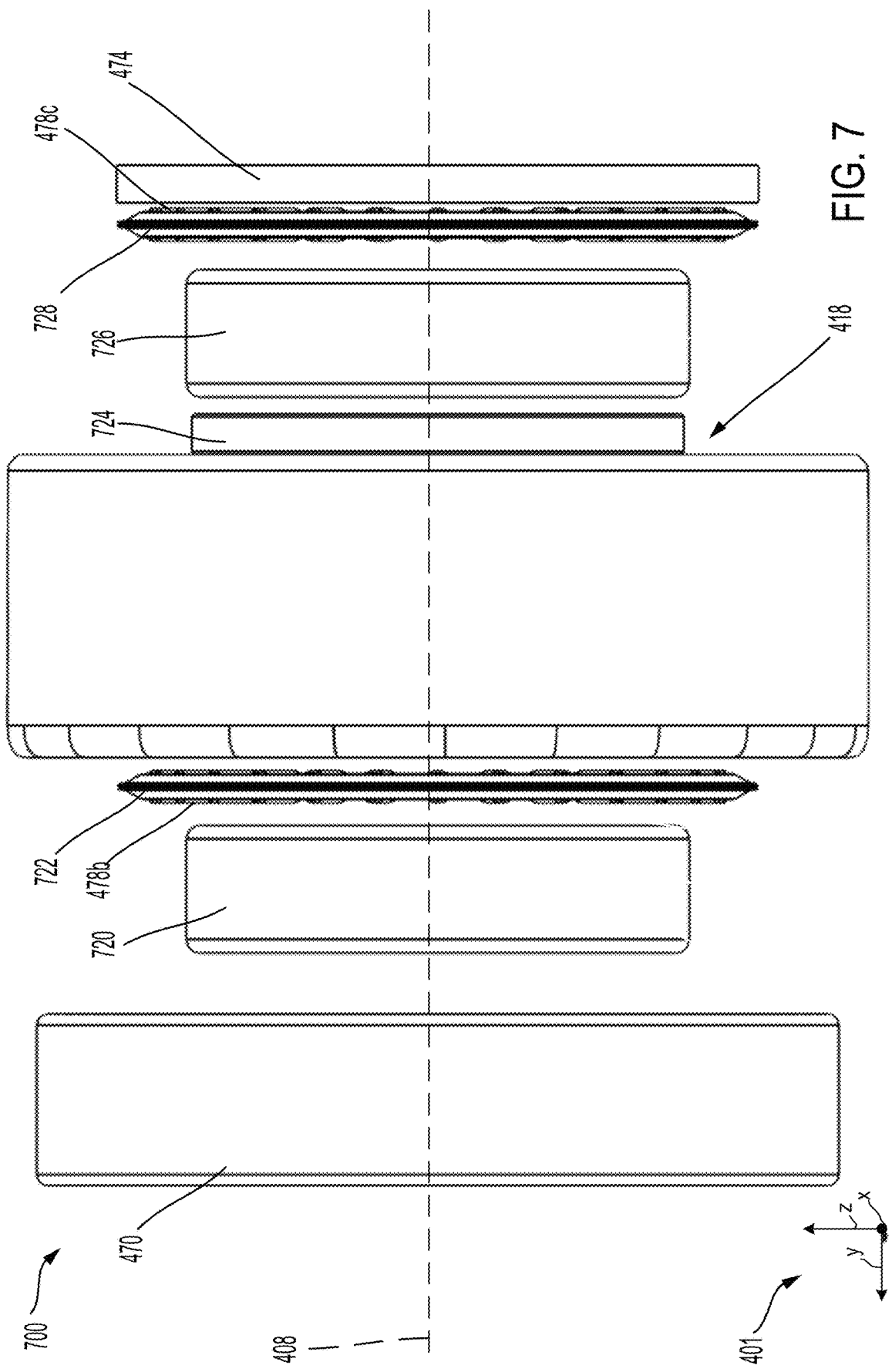
FIG. 7 shows an exploded view of a components that may be radially enclosed by the gear of the assembly of FIG. 4.
Figure 8A:
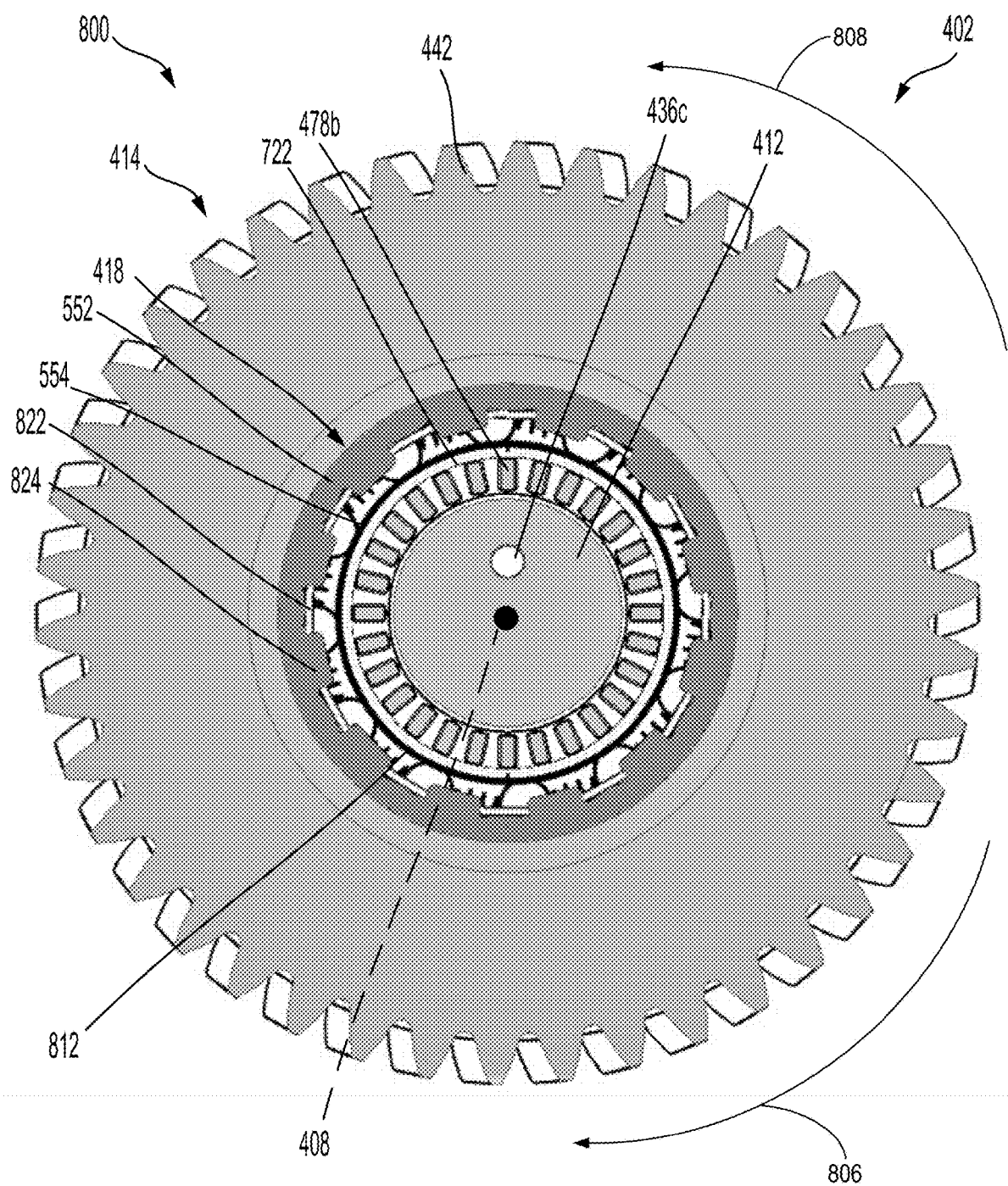
FIG. 8A shows a third sectional view of the first clutch from a first line taken on the assembly in FIG. 4.
Figure 8B:
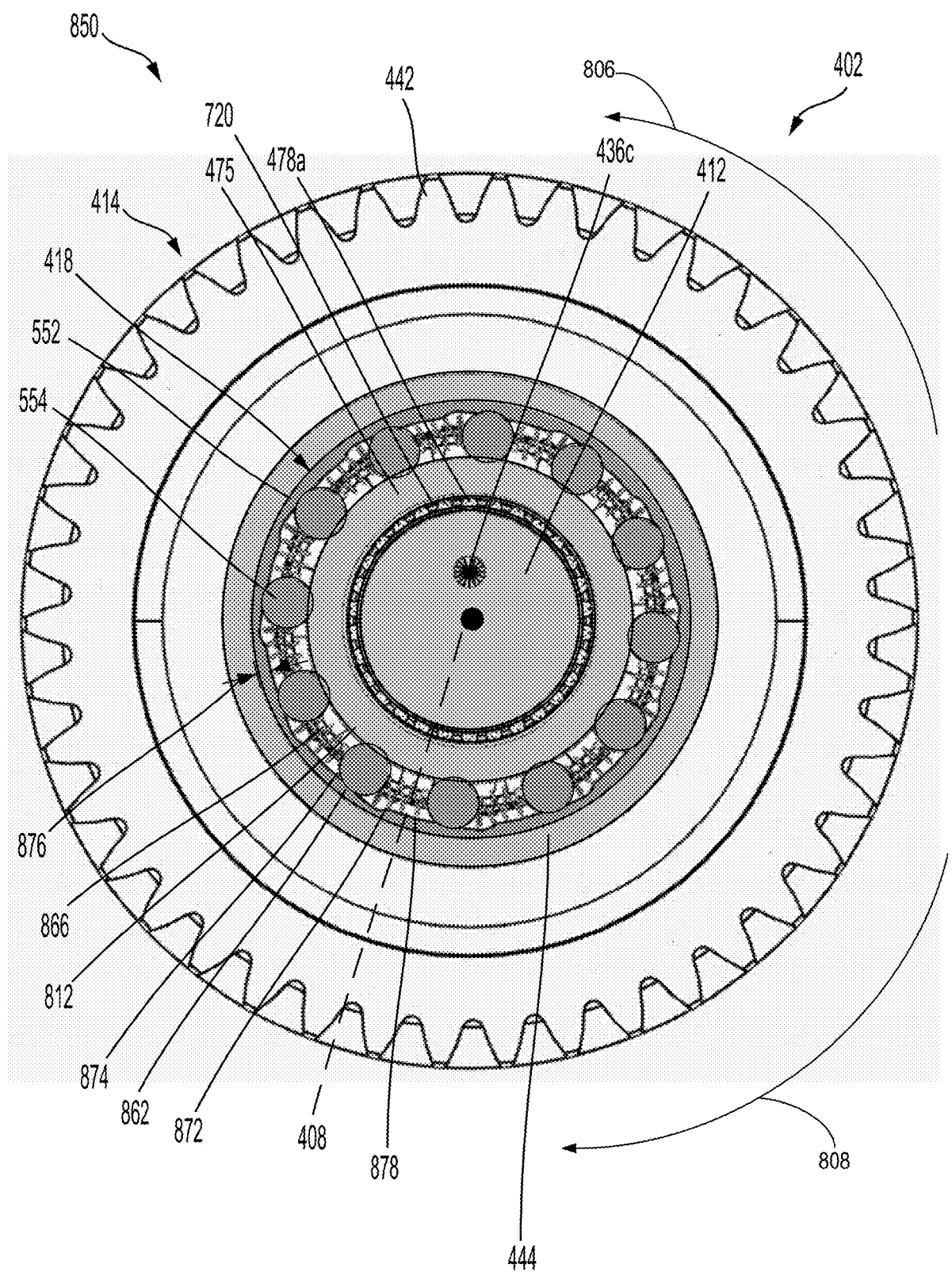
FIG. 8B shows a fourth sectional view of a first clutch from a second line taken on the assembly in FIG. 5.
Figure 9:
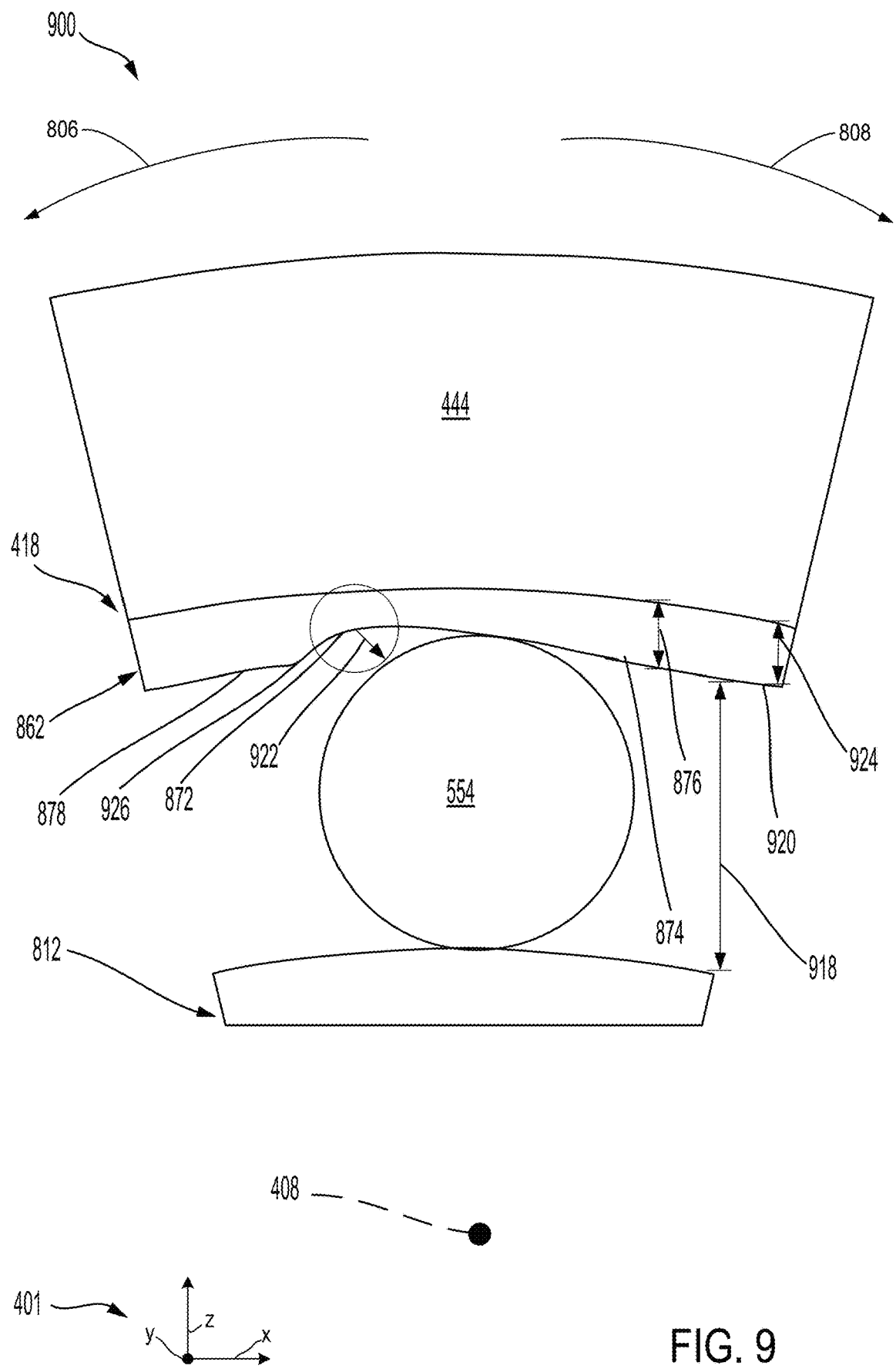
FIG. 9 shows a fifth sectional view of the of a section of the first clutch about a cartridge and a peak of a first outer race of the first clutch of FIG. 8B.

FIG. 7 shows an exploded view of components that may be radially enclosed by the gear of the assembly of FIG. 4. Such components are shown isolated from the other components of the assembly in FIG. 4. Such components may include assemblies that may support bearings and bearing assemblies, where the bearings and bearing assemblies support the hub of the assembly of FIG. 4. FIG. 8A shows a third sectional view of the first clutch from a first line taken on the assembly in FIG. 4. FIG. 8B shows a fourth sectional view of a first clutch from a second line taken on the assembly in FIG. 4. FIGS. 8A-8B show components of the one-way clutch of FIG. 4. FIG. 9 shows a fifth, schematic sectional view of the of a section of the first clutch about a cartridge and a peak of a first outer race of the first clutch of FIG. 8B.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIGS. 1-3B and FIG. 9 show schematics of example configurations with relative positioning of the various components. FIGS. 4-5 and FIGS. 7-8B show example configurations with approximate positions. As used herein, the terms "approximately" is construed to mean plus or minus five percent of the range unless otherwise specified. FIGS. 3A-5 and 7-9 are shown approximately to scale.

Further, FIGS. 1-5 and FIGS. 7-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to the longitudinal axis. Features described as lateral may be approximately parallel with the lateral axis and normal to the longitudinal axis.

Turning now to FIG. 1, a vehicle 100 is shown comprising a powertrain 101 and a drivetrain 103. The powertrain 101 comprises a prime mover 106 and a transmission 108. The prime mover 106 may be an internal combustion engine (ICE) or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting. In one example, the prime mover 106 is one of a plurality of prime movers, wherein each of the prime movers may include various of the powertrain components for supplying power to the wheels and/or other components of the vehicle 100.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be in industrial, locomotive, military, agricultural, and aerospace applications. In one example, the vehicle 100 is an all-electric vehicle or a vehicle with all-electric modes of operation, such as a plug-in hybrid vehicle. As such, the prime mover 106 is an electric machine. In one example, the prime mover 106 is an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some embodiments, additionally or alternatively, the transmission 108 may be a first transmission, further comprising a second transmission arranged on the second set of axle shafts 128. Herein, the transmission 108 may be interchangeably referred to as a gearbox.

Turning to FIG. 2, it shows an electric drivetrain 200 including a clutch assembly 240 and an electric machine 204. The electric machine 204 may be used similarly to prime mover 106 in vehicle 100 of FIG. 1.

The electric machine 204 may include an output shaft 210 on which an output gear 234 is arranged. The output gear 234 may be a first gear of a transmission, such as transmission 108 of FIG. 1. The output gear 234 may be interlocked with a second gear 236. In one example, the second gear 236 is one of a plurality of gears of the transmission. The second gear 236 may be arranged on and configured to rotate a shaft of the transmission, wherein other gears of the transmission arranged on the shaft may also rotate based on power received from the output gear 234. The other gears may be configured to amplify or reduce the torque received from the electric machine 204 and transmit the torque to components other than the clutch assembly 240.

The clutch assembly 240 may include an input gear 244 arranged on a shaft 242. The input gear 244 may be interlocked with the second gear 236. The clutch assembly 240 may further include a one-way clutch 246, a hub 248, and a plurality of friction plates 252. The friction plates 252 may selectively couple to a plurality of separator plates 254. The plurality of separator plates 254 are physically coupled to a drum 256 of the shaft 242. Each of the input gear 244 and the hub 248 may be supported by bearings, such that the input gear 244 and the hub 248 may rotate independently of the shaft 242.

When the plurality of friction plates 252 and the plurality of separator plates 254 are pressed together, the hub 248 may transfer power to the shaft 242, such as via the drum 256. When pressed together, the friction plates 252 and the separator plates 254 may be referred to as engaged. Engagement and disengagement of the plates may be executed via a piston, as shown in FIG. 4.

The one-way clutch 246 may control a coupling and a decoupling of the input gear 244 and the hub 248. In one example, the one-way clutch 246 is a freewheel. A direction of rotation may be selected during manufacture of the electric drivetrain 200 for closing the one-way clutch 246 and decoupling the input gear 244 and the hub 248. By doing this, a speed differential across the friction plates 252 and separator plates 254 may be avoided, despite a speed of the input gear 244 being greater than a speed of the hub 248 by a threshold amount.

In a real-world example, when the second gear 236 is spinning above a threshold speed, the one-way clutch 246 may be opened and decouple the input gear 244 from the hub 248. The second gear 236 may spin above the threshold speed during a power take-off (PTO) drive or transmission drive. For example, if the transmission is operating with two electric motors, one of the two electric motors may be decoupled from the transmission drive if the PTO operation is desired.

Turning to FIG. 3A, it shows a first schematic 304 of the input gear 244, the one-way clutch 246, and the shaft 242 in a first sectional view 300. Turning to FIG. 3B, it shows a second schematic 306 of the drum 256, the hub 248, and the shaft 242 in a second sectional view 302. As such, components previously introduced are similarly numbered in these figures. Collectively, apart from the shaft 242, the components shown in FIGS. 3A and 3B are components of the clutch assembly 240. The clutch assembly 240 includes components associated with a wet clutch, such as the input gear 244, the hub 248, the friction plates 252, the separator plates 254, and the drum 256. The clutch assembly 240 further includes the one-way clutch 246 integrally packaged as a single clutch system. The clutch assembly 240 is centered about a central axis 311 about which the shaft 242 may rotate.

The components of the first schematic 304 and second schematic 306 may spin about the axis 311 in a first direction 312 or a second direction 314. In one example, the first direction 312 may be counter-clockwise and the second direction 314 may be clockwise.

The one-way clutch 244 may be sandwiched between the hub 248 and the input gear 244. In one example, the hub 248 may include a hub arm that extends between the one-way clutch 246 and the shaft 242. An inner race 316 of the one-way clutch 246 may be in face sharing contact with the hub arm. An outer race 326 of the one-way clutch 246 may be in face-sharing contact with an inner diameter of the input gear 244. The one-way clutch 246 may further include a plurality of locking elements 332 and springs 336. The plurality of locking elements 332 may be arranged in cavities 335. The cavities 335 may be asymmetric such that when the plurality of locking elements 332 move in the first direction 312, the one-way clutch 246 is open and the input gear 244 and the hub 248 are rotationally coupled. When the plurality of locking elements 332 spin in the second direction 314, the one-way clutch 246 is closed and the input gear 244 and the hub 248 are decoupled.

For the configuration shown in the first schematic 304 and the second schematic 306, a relative speed greater than a first threshold between hub 248 and drum 256 may occur when the electric machine 204 transfers rotational energy at a speed greater than a second threshold to the output gear 234, with reference to FIG. 2. Speeds greater than a second threshold may only occur when the electric machine 204 transfers torque in a direction such that the input gear 244 rotates in the second direction 314.

However, it is to be appreciated that the configuration shown in schematic 304 may be non-limiting. For example, there may be other configurations of the one-way clutch 246 that may lock when the input gear 244 rotates in the second direction 314 and/or the hub 248 rotates in the first direction 312.

In one example, the locking elements 332 may be cylindrical rollers or spheres, such as locking rollers, that may each be coupled to a spring of the springs 336. It is to be appreciated that the type of locking element may be non-limiting and other locking elements may be used. For another example, a one-way clutch may be another type of freewheel clutch, such as a sprag clutch, using a plurality of sprags in place of locking rollers or other rollers used in place of the locking elements 332. For another example, each of a plurality of locking elements may be a ratchet like tooth, such as in a ratchet freewheel clutch.

Turning to FIG. 4, it shows a first view 400 of an assembly 402 of the present disclosure. The first view 400 may be a sectional side view of the assembly 402, dividing the assembly 402 longitudinally. The assembly 402 may be located longitudinally between a first side 404 and a second side 406. The assembly 402 may be centered on an axis 408. Axis 408 may be parallel to a longitudinal direction. The assembly 402 may include a shaft 412 and a gear 414 that may each be selectively coupled to a hub 420. The gear 414 may receive an input torque from a rotational device, such as a gear, a shaft, or other similar device. The gear 414 may act as an input gear for and transfer torque to the assembly 402. The gear 414 may be selectively coupled to the hub 420 via a one-way clutch 418. The one-way clutch 418 may be arranged between the gear 414 and the hub 420. When the one-way clutch 418 is locked and the wet clutch 416 is closed, rotational energy may be transferred as torque from the gear 414 to the hub 420 and then to the shaft 412.

A set of reference axes 401 are provided for comparison between views shown in FIGS. 4-5, and FIGS. 7-8B. The reference axes 401 indicate a y-axis, an x-axis, and a z-axis. In one example, the z-axis may be parallel with a direction of gravity and the x-y plane may be parallel with a horizontal plane that an assembly 402 may rest upon. When referencing direction, positive may refer to in the direction of the arrow of the y-axis, x-axis, and z-axis and negative may refer to in the opposite direction of the arrow of the y-axis, x-axis, and z-axis.

The shaft 412 may include an opening 428 comprising a plurality of splines 424. A first bearing assembly 430 may be located radially, with respect to axis 408, about the shaft 412 at the first side 404. A second bearing assembly 432 may be located radially, with respect to the axis 408, about the shaft 412 at the second side 406, opposite the first side 404. The first and second bearing assemblies 430, 432 may include a plurality of bearings, such as ball bearings or roller bearings. The first and second bearing assemblies 430, 432 may support and allow the rotation of the shaft 412 within a corresponding housing.

The shaft 412 may include a plurality of passages. The plurality of passages may be arranged in an interior of the shaft 412 and configured to conduct fluid through an interior of the shaft 412 to one or more components arranged radially relative to the shaft 412. In one embodiment, the plurality of passages may include a first passage 436a that may be approximately centered about the axis 408. In one example, the first passage 436a is a central passage. The plurality of passages may further include a second passage 436b and a third passage 436c that may be located at positions radially about the axis 408. In one example, the second passage 436b is a first outer passage and the third passage 436c is a second outer passage. The plurality of passages may conduct fluid in a longitudinal direction parallel to the axis 408. One or more of the plurality of passages may include one or more outlets for expelling fluid in a radial direction, normal to the axis 408.

The first passage 436a may be sealed from components of the wet clutch 416. In one example, the first passage 436a retains fluid flowing therein and does not expel fluid toward the components of the wet clutch 416.

The second and third passages 436b, 436c, may be configured as a first outer passage and a second outer passage, respectively, that may fluidly couple to components of the wet clutch 416. A plurality of openings may direct fluid radially, with respect to the axis 408, outward from the second and third passages 436b, 436c, away from the shaft and to components of the wet clutch 416. For example, the second passage 436b may be fluidly coupled to a piston chamber of the wet clutch 416 which houses a piston 458, via a second passage outlet 496.

The third passage 436c may be fluidly coupled to one or more of the piston chamber, a hub 420, a hub extension 475, and a gear 414. The third passage 436c may be fluidly coupled to the gear 414 via a first third passage outlet 488. The third passage 436c may be fluidly coupled to the hub extension 475 via a second third passage outlet 490. The third passage 436c may be fluidly coupled to the hub 420 via a third third passage outlet 492. The third passage 436c may be fluidly coupled to the piston chamber via a fourth third passage outlet 494.

In one example, the second passage outlet 496 may direct fluid to a surface 498 of the piston chamber and the fourth third passage outlet 494 may direct fluid to an interior volume of the piston chamber. Additionally or alternatively, the second passage outlet 496 may be positioned closer to the second side 406 relative to the fourth third passage outlet 494. In one example, the second passage outlet 496 may be larger than each of the first third passage outlet 488, second third passage outlet 490, third third passage outlet 492, and fourth third passage outlet 494.

The second passage 436b and the third passage 436c may further include a first opening 440a and a second opening 440b, respectively. The first opening 440a and the second opening 440b may expel fluid to other components arranged on the shaft 412 outside of the wet clutch 416. A lance, or other element may be arranged at an extreme end of the shaft 412 opposite the opening 428, and may guide fluid into each of the plurality of passages. In one example, the fluid flowing through the plurality of passages is a lubricant, such as oil.

The first passage 436a may include a first length. The second passage 436b may include a second length. The third passage 436c may include a third length. The third length may be greater than the second length, and the second length may be greater than the first length. The lengths of the plurality of passages may be adjusted in some embodiments.

The shaft 412 may be coupled to a disk 438 that may extend radially, with respect to axis 408, from the shaft 412. The disk 438 may be located about the axis 408, between the first bearing assembly 430 and the gear 414. The disk 438 may be a flywheel in one example. Additionally or alternatively, the disk 438 may be a flange or other device for mounting the shaft to a housing or other device.

The gear 414 may include a plurality of teeth 442 that extend radially outward therefrom. The plurality of teeth 442 may interlock with another gear that receives an output from an electric machine. The gear 414 may include a gear arm 444 that extends toward the second side 406 from the gear 414. In one example, the one-way clutch 418 may be arranged between the gear arm 444 and the hub extension 475.

An outer diameter of the gear arm 444 may be equal to an outer diameter of the hub 420. As such, the outer diameter of the hub 420 is equidistant to the outer diameter of the gear arm 444 relative to the shaft 412. The hub 420 may have an inner diameter in face-sharing contact with the shaft 412. In some embodiments, a disk 474 may be in face-sharing contact with the hub 420 and the shaft 412. The disk 474 may be located radially about the shaft 412. An inner diameter of the hub extension 475 may be interior to an inner diameter of the gear arm 444. The one-way clutch 418 may be arranged between the inner diameter of the hub extension 475 and the inner diameter of the gear arm 444. The hub extension 475 may act as a hub arm for hub 420 to support and couple to the inner diameter of the one-way clutch 418. The hub extension 475 may extend in the direction of the gear 414.

A third bearing assembly 468 may support the gear 414 on the shaft 412. Additionally or alternatively, a fourth bearing assembly 470 may support the gear 414 on the shaft 412. The third bearing assembly 468 may be larger, wherein at least the diameter and depth are larger, than the fourth bearing assembly 470. Additionally or alternatively, the third bearing assembly 468 may be equal in size or smaller than the fourth bearing assembly 470. The gear arm 444 may be in direct contact with the third bearing assembly 468 and the fourth bearing assembly 470. The gear arm 444 may include a first inner diameter adjacent the third bearing assembly 468 and a second inner diameter, greater than the first inner diameter, about the fourth bearing assembly 470. The third bearing assembly 468 and the fourth bearing assembly 470 may allow the gear 414 and the shaft 412 to rotate independently of one another.

The first third passage outlet 488 may expel lubricant through a gap between the third bearing assembly 468 and the fourth bearing assembly 470. The lubricant may flow through the gap and contact the gear arm 444 and other portions of the gear 414.

A drum arm 452 may form a portion of the housing for the wet clutch 416 and is physically coupled to the shaft 412. The drum arm 452 may include a drum 454 that extends from the drum arm 452 toward the gear 414. The drum 454 may be cylindrical, and located radially about the shaft 412. The drum 454 may be spaced away from the gear 414. The drum 454 may include a plurality of separator plates 455 physically coupled thereto. An end plate 453 may be arranged between the plurality of separator plates 455 and the gear 414. The end plate 453 may be physically coupled to the drum 454.

The piston chamber, which houses the piston 458, may be shaped by the piston 458 and a chamber flange 460. Located between the chamber flange 460 and piston 458 may be a piston chamber, herein referred to as a compression chamber 462. The compression chamber 462 may be sealed from a remainder of the wet clutch in one example. Additionally or alternatively, the piston chamber may leak to other portions of the wet clutch 416, such as the plurality of separator plates 455. The drum arm 452 and portions of the drum 454 may surround the piston 458. The piston 458 and chamber flange 460 may be coupled via a plurality of springs 464. The plurality of springs 464 apply a force against the piston 458 in a direction toward the second side 406 and away from the drum arm 452. When hydraulic fluid enters the piston chamber, between the piston 458 and the drum 454 and is at a pressure to overcome a force of the plurality of springs 464, to the piston 458 may move toward the plurality of separator plates 455 and compress the springs 464. The piston 458 may additionally compress the engagement spring 480 and press the plurality of friction plates 456 and the plurality of separator plates 455 to transfer torque. When the piston 458 moves toward the drum arm 452 to an open position, such as when the hydraulic fluid pressure is less than a spring force of the plurality of springs 464, the plurality of separator plates 455 may decouple from a plurality of friction plates 456. Collectively the separator plates 455 and friction plates 456 may act as components of a clutch pack to drivingly couple the drum arm 452 to the hub 420. The second passage 436b and third passage 436c may be responsible for directing work fluid to act as hydraulic fluid for piston chamber and the piston 458 via openings, such as the second passage outlet 496 and the fourth third passage outlet 494.

In the open position, the hub 420 may rotate independently of the shaft 412 and power from the hub 420 may not transfer to the shaft 412. In the closed position, where the fluid in the piston chamber does not overcome a force of the plurality of springs 464, the hub 420 may transfer power to the shaft 412 such that a rotation of the hub 420 is translated to the shaft 412. A plurality of engagement springs 480 may press against the plurality of separator plates 455, which may result in the separator plates 455 being pressed against the friction plates 456, thereby engaging the hub 420 with the drum 454, and thus to the drum arm 452. Power as rotational energy may be transferred via torque from the hub 420 to the drum arm 452 and from the drum arm 452 to the shaft 412, in the closed position. The drum arm 452 may therein rotate with the hub 420, and the shaft 412 may therein rotate with the drum arm 452 and hub 420.

In some embodiments, the drum arm 452 may be supported on the shaft 412 via a fifth bearing assembly 466. Additionally or alternatively, the drum arm 452 may be physically coupled to the shaft 412 and the drum 454 may be coupled to the drum arm 452 via one or more elements.

The hub extension 475 and the hub 420 may be supported on the shaft 412 via a plurality of bearings, such as a plurality of first sixth bearings 478a, second sixth bearings 478b, and third sixth bearings 478c. In one example, the second third passage outlet 490 may direct lubricant to a gap between the plurality of first sixth bearings 478a, wherein the lubricant may flow to the hub extension 475. The first, second, and third sixth bearings 478a, 478b, 478c may be in face sharing contact with the hub extension 475 and the shaft 412.

In some embodiments, the third sixth bearings 478c may be positioned such that the third sixth bearings 478c are sandwiched between the disk 474 and the hub extension 475.

Turning to FIG. 5, it shows a more detailed view 500 of the wet clutch 416. The plurality of separator plates 455 may be physically coupled to an inner surface 520 of the drum 454. The inner surface 520 may have a plurality of first splines acting as inner splines. The first splines may be complementary to a plurality of second splines that may act as outer splines, such that the first splines may mate and physically couple to the second splines. Each of the separator plates 455 may be joined to or physically coupled to at least one of the second splines, such that the mating of the first and second splines may physically couple one or more of the separator plates 455 to the drum 454.

The plurality of friction plates 456 may be physically coupled to an outer surface 522 of the hub 420. The outer surface 522 may have a plurality of third splines that may act as outer splines. The third splines may be complementary to a plurality of fourth splines that may act as inner splines, such that the fourth splines may mate and physically couple to the third splines. Each of the friction plates 456 may be joined to or physically coupled to at least one of the fourth splines, such that the mating of the third and fourth splines may physically couple one or more of the friction plates 456 to the hub 420.

Some of the plurality of separator plates 455 and the plurality of friction plates 456 may be positioned to alternate in a direction along the axis 408. For example, a separator plate of the plurality of separator plates 455 may be arranged between neighboring friction plates of the plurality of friction plates 456. Additionally, a friction plate of the plurality of friction plates 456 may be arranged between neighboring separator plates of the plurality of separator plates 455. The friction plates 456 and separator plates 455 in these aforementioned positions may be referred to as interleaved. When the plates are in the open position, there may be gaps arranged between adjacent separator plates 455 and friction plates 456. When the plates are in the closed position, adjacent separator plates 455 may be in face-sharing contact with the friction plates 456.

There may be a plurality of end separator plates 540a that are coupled to the engagement springs 480. The engagement springs 480 may actuate the end separator plates 540a to and away from the plurality of separator plates 455 and the plurality of friction plates 456. A domino effect may occur, wherein the end separator plates 540a contacts a neighboring friction plate and results in each of the friction plates 456 and separator plates 455 contacting one another. Likewise, when the end separator plates 540a move away from the neighboring friction plate, each of the friction plates 456 and separator plates 455 may move away from one another and the hub 420 may decouple from the drum 454.

The one-way clutch 418 may include a clutch carrier 552 that houses and supports a plurality of locking elements. In one example, the locking elements supported by the clutch carrier 552 may be a plurality of spring mounted bearings, such as a plurality of locking rollers 554. An example embodiment of the one-way clutch 418 is shown in FIGS. 8A and 8B.

In one example, a plurality of gaskets and other elastomeric devices may be arranged between the shaft 412 and components arranged thereon. For example, a first O-ring 562 and a second O-ring 564 may be spaced about the third passage outlet 492 between the hub 420 and the shaft 412.

The shaft 412 may further include one or more lubricating grooves on an outer surface thereof that may receive lubricant and lubricate inner surfaces of components arranged on the shaft 412. A first groove 566 may direct lubricant on the shaft 412 to an inner surface of the chamber flange 460, such as a first inner surface 572. A second groove 568 may direct lubricant on the shaft 412 to an inner surface of the piston 458, such as a second inner surface 574.

Turning to FIG. 6, it shows an example of a method 600 to adjust a plurality of clutches of an assembly of the present disclosure, such as assembly 402. Method 600 may begin at 602, wherein work fluid pressure is increased to a wet clutch of the assembly, such as wet clutch 416 of FIG. 4.

As work fluid pressure is increased to the wet clutch, method 600 proceed to 603 where pressure is increased to a compression chamber of the wet clutch, such as compression chamber 462 of FIG. 4. As pressure is decreased to the compression chamber, method 600 may proceed to 604 where the springs of the piston chamber, such as springs 464 of FIG. 4, may contract. The springs may contract if the force from pressure of the work fluid on the piston becomes greater than the spring force of the springs. As the springs contract, method 600 may proceed to 606 where the piston of the wet clutch, such as piston 458 of FIG. 4, is translated. The piston may be translated toward a clutch pack of the wet clutch, such as the clutch pack with the separator plates 455 and friction plates 456 of FIG. 4.

The method 600 may proceed to 608, wherein torque is transferred through the hub. Engaging the wet clutch but actuating the plates via the piston may drivingly couple the hub to the shaft of the assembly.

The method 600 may proceed to 614, which includes determining if a gear speed is less than a threshold speed. In one example, the threshold speed may be based on a speed where degradation to the wet clutch may occur. If the gear speed of the second gear and/or the input gear is not less than the threshold speed, then a speed differential across the wet clutch between the input gear and the hub may be higher than desired. At 616, the method 600 may include closing the one-way clutch and stopping torque transfer from the input gear to the hub of the wet clutch.

Returning to 614, if the gear speed is less than the threshold speed, then at 618, the method 600 may include opening the one-way clutch.

At 620, the method 600 may include transferring torque from the gear to the hub. The hub may then transfer torque to the shaft based on a pressure of working fluid (e.g., hydraulic fluid) flowing to a piston of the wet clutch.

Turning to FIG. 7, it shows a third view 700 of bearings, races, and the one-way clutch 418 that may be radially concentric to the gear arm 444 of FIG. 4, with respect to axis 408, when isolated from other components of the assembly 402 of FIG. 4. The third view 700 is an exploded view.

In order between the fourth bearing assembly 470 and the disk 474 are a first race 720, a second race 722, a third race 726, and fourth race 728 that may be positioned radially about the axis 408. When unexploded, first race 720 may be located radially about the axis 408 and positioned between the second race 722 and third race 726. The first race 720, the second race 722, the third race 726, and the fourth race 728 may be positioned radially within the one-way clutch 418, with respect to axis 408. As shown in third view 700, a separator 724, such as a sleeve, may be located between the second and third races 722, 726 and radially about the axis 408. Additionally, when the assembly 402 is un-exploded, the separator 724 may be located between the first and third races 720, 726 on and radially about the axis 408. The separator 724 may allow work fluid to flow from a passage of the shaft 412 to the first sixth bearings 478a, with reference to FIGS. 4-5. The separator 724 may be positioned about the second third passage outlet 490 of FIG. 4. The first and third races 720, 726 may house and support the first sixth bearings 478a. The second race 722 may house and support the second sixth bearings 478b. The fourth race 728 may house and support the third sixth bearings 478c.

Turning to FIG. 8A, it shows a fourth view 800 of the assembly 402. The fourth view 800 is a sectional view showing the gear 414, the one-way clutch 418, and the shaft 412 taken on the first line 409 of FIG. 4. The gear 414 and one-way clutch 418 may spin radially about the axis 408 in a first direction 806 or a second direction 808. Likewise, the shaft 412 may spin in the first direction 806 or second direction 808 about the axis 408, independently of the gear 414 and one-way clutch 418.

The fourth view 800 shows the clutch carrier 552 and the locking rollers 554 may be located radially, with respect to axis 408, about an inner race 812. The inner race 812 may be positioned radially about the hub extension 475 of the hub 420 of FIG. 4. The inner race 812 may be part of, joined to, or physically coupled to an outer surface of the hub extension 475. In the fourth view 800, the hub extension 475 of the hub 420 may be located in the positive y-direction from the second race 722 with respect to the reference axes 401. The locking rollers 554 may be in surface sharing contact with the inner race 812. The locking rollers 554 may roll along a surface of the inner race 812. The inner race 812 may spin with the hub 420 radially about the axis 408 in either the first direction 806 or the second direction 808.

A ring 822 may support the locking rollers 554, such that the locking rollers 554 may rotate radially about the axis 408. The ring 822 may be coupled to the clutch carrier 552 via a plurality of mounts 824. There may be a ring and a plurality of mounts of the same dimensions as ring 822 and mounts 824, respectively, but mirrored on the opposite side of the clutch carrier 552. The aforementioned ring and mounts may be on the opposite side of the locking rollers 554 from ring 822 and mounts 824. The aforementioned rings and mounts may support the locking rollers 554 as ring 822 and mounts 824.

Turning to FIG. 8B, it shows a fifth view 850 of the assembly 402. The fifth view 850 is a sectional view showing the gear 414, one-way clutch 418, and hub extension 475 taken on the second line 410 of FIG. 4. The fifth view 850 may mirror the fourth view 800 with respect to the reference axes about y-axis.

Fifth view 850 shows an outer race 862 formed of the clutch carrier 552 located radially, with respect to axis 408, about the locking rollers 554 and hub extension 475. The outer race 862 may spin radially about the axis 408 in the direction of the gear 414 and by extension the gear arm 444 of FIG. 4. The outer race 862 may rotate with the clutch carrier 552. The inner race 812 may spin radially about axis 408 in the direction both the hub extension 475 and the hub 420 of FIG. 4 may rotate.

Between and coupled to each of the locking rollers 554 is a spring from a plurality of springs 866. The springs 866 may be positioned radially about axis 408 with the locking rollers 554. Each of the springs 866 may be coupled to one of the locking rollers 554.

For an example of an embodiment of the one-way clutch 418, the outer race 862 may have a plurality of indentations, such as a plurality of cartridges 872. Likewise, the outer race 862 may have a plurality of inclines 874. The cartridges 872 and inclines 874 may alternate in a repeating pattern in a radial direction, with respect to axis 408, with the outer race 862. The cartridges 872 and inclines 874 are features part of an inner surface 878 of the outer race 862. The inner surface 878 may be of a height 876 that extends radially toward the axis 408. The height 876 may decrease in distance between the inclines 874 and the cartridges 872 in the first direction 806. When about the cartridges 872, the height 876 may increase in distance in the first direction 806 before the inner surface 878 forms back into an incline of the inclines 874. The increase in the height 876 at the cartridges 872 may produce a parabolic profile in shape, such that each of the cartridges 872 are rounded and smooth.

When rolling toward or on the inclines 874, the locking rollers 554 may jam between the outer race 862 and inner race 812. When the locking rollers 554 are jammed, the locking rollers 554 may drivingly couple the outer race 862 and gear 414 to the inner race 812 and the hub extension 475. When the locking rollers 554 are jammed, the locking rollers 554 may therein drivingly couple the gear 414 to the hub 420 of the extension 475. Likewise, when rotating toward or in surface sharing contact with the cartridges 872, the locking rollers 554 may roll and allow the outer race 862 and inner race 812 to slide past the locking rollers 554. The outer race 862 and gear 414 may rotate freely of the inner race 812 and the hub extension 475. Likewise, the gear 414 and the hub 420 of the extension 475 may rotate freely from one another.

For an example an embodiment of assembly 402, the locking rollers 554 may jam with the inclines 874 when the gear 414 rotates in the first direction 806. Additionally or alternatively, if the locking rollers 554 rotate in the second direction 808, the locking rollers 554 may jam against the inclines 874 between the inner race 812 and the outer race 862. Additionally or alternatively, the locking rollers 554 may jam against the inclines 874 when the hub extension 475 rotates in the second direction 808.

For this example, the locking rollers 554 may rotate toward or in surface sharing contact with the cartridges 872 when the gear 414 rotates in the second direction 808. Additionally or alternatively, if the locking rollers 554 rotate in the first direction 806, the locking rollers 554 may rotate toward or in surface sharing contact with the cartridges 872. Additionally or alternatively, the locking rollers may rotate toward or in surface sharing contact with the cartridges 872 when the hub extension 475 and inner race 812 rotate in the first direction 806.

However, it should be appreciated, that that for another embodiment of assembly 402 the cartridges 872 and inclines 874 may be positioned to lock the locking rollers 554 when the locking rollers 554 roll in the first direction 806 or the outer race 862 and cartridges 872 rotate in the second direction 808 about the axis 408. For example, if the gear 414 rotates in the first direction 806, the locking rollers 554 may enter and rotate in the cartridges 872, and the gear 414 may rotate freely of the hub 420. For this example, if the gear 414 rotates in the second direction 808, the locking rollers 554 may lock against the inclines 874. When the locking rollers 554 lock, the gear 414 may then transfer torque and drivingly couple to the hub extension 475.

Turning to FIG. 9, a sixth view 900 shows additional details of the cartridges 872, inclines 874, inner race 812, and outer race 862 as a schematic. Sixth view 900 shows one of the cartridges 872, one of the inclines 874, and one of the locking rollers 554.

Located radially, with respect to the axis 408, between the inner race 812 and outer race 862 is a clearance 918. The clearance 918 may be variable, changing in distance with the inner surface 878 of the outer race 862. The clearance 918 may be a maximum distance at a cartridge of the cartridges 872. The clearance 918 may be a minimum distance at a plurality of peaks 920 of the inner surface 878 and an incline of the inclines 874. Likewise, the height 876 may be at a minimum at the origin of a plurality of radii 922 of the cartridges 872. The height 876 may be at a maximum at the peaks 920, such as at a plurality of heights 924. The radii 922 are a distance such that the locking rollers 554 may roll in the cartridges 872. Additionally, the radii 922 are a distance such that the outer race 862 and inner race 812 may slide past the locking rollers 554, when the locking rollers 554 are in surface sharing contact with the cartridges 872. The cartridges 872 may have a plurality of curves 926. The curves 926 may prevent the locking rollers 554 from moving out of the cartridges 872, such as when the locking rollers 554 rotate in the first direction 806 and/or when the outer race 862 rotates in the second direction 808. The plurality of heights 924 at the peaks 920 are a distance, such that the locking rollers 554 may lock and not roll past the peaks 920 in the second direction 808. Likewise, the heights 924 and the distance of clearance 918 at the peaks 920 are such that the inner race 812 and outer race 862 may not slide past the locking rollers 554, when the locking rollers 554 are locked with the inclines 874.

Thus, disclosed herein are systems and components for a clutch assembly formed of a wet clutch and a one-way clutch. The clutch assembly may allow rotating components and elements of a transmission and/or gearbox assembly to selective couple. The clutch assembly may incorporate a gear and a hub that are separate components, and may be selectively coupled. The one-way clutch may selectively and drivingly couple with a first rotational element when the first rotational element rotates in a first direction. The one-way clutch may not selectively and drivingly couple or may decouple the first rotational element from the second rotational element, when the first rotational element rotates in a second direction. The one-way clutch may be arranged between and selectively couple the first rotational element and a second rotational element, such that the one-way clutch may drivingly couple the first and second rotational elements. The first rotational element may be the gear and the second rotational element may be the hub. The first and second rotational element may be arranged such that if a high relative rotational speed, such as at or exceeding 15000 RPM, is generate between a first rotational element and a second rotational element, the first rotational element may rotate in the second direction. At the high relative rotational speed, the one-way clutch may not couple the first rotational element to the second rotational element. When the first rotational element rotates in second direction, the one-way clutch may not couple the first rotational element to the second rotational element. The one-way clutch and second rotational element may be selectively coupled to an input, such as a shaft, via a wet clutch. The hub may be shared between the one-way clutch and the wet clutch. The hub may have a first section and a second section of a first diameter and a second diameter, respectively. The first diameter may be different from the second diameter, for example the second diameter may be greater than the first diameter. The first section of the hub may selectively couple and support the one-way clutch. The second section of the hub may be part of the wet clutch and selectively couple to a drum of the wet clutch. The second section of the hub may be an extension from the hub and act as a hub arm to support and couple to components of the clutch assembly.

The disclosure provides support for a wet clutch for an electric motor including a plurality of friction plates coupled to a hub, a plurality of separator plates coupled to a drum and interleaved with the plurality of friction plates, a gear coupled to an output of the electric motor, and a one-way clutch integrally arranged in the wet clutch between the gear and the hub. A first example of the wet clutch further includes where the wet clutch is arranged on a shaft. A second example of the wet clutch, optionally including the first example, further includes where the shaft comprises a plurality of fluid passages including a central passage sealed from the wet clutch, a first outer passage fluidly coupled to a piston chamber of the wet clutch, and a second outer passage fluidly coupled to the piston chamber, the hub, an extension of the hub, and the gear. A third example of the wet clutch, optionally including one or more of the previous examples, further includes where the extension of the hub is arranged between the one-way clutch and the shaft. A fourth example of the wet clutch, optionally including one or more of the previous examples, further includes where a first bearing and a second bearing are arranged between the gear and a shaft on which the wet clutch is arranged. A fifth example of the wet clutch, optionally including one or more of the previous examples, further includes where the one-way clutch adjusts a coupling between the gear and the hub based on a direction of rotation of the gear. A sixth example of the wet clutch, optionally including one or more of the previous examples, further includes where the one-way clutch is coupled to an inner diameter of the gear and an outer diameter of the hub.

The disclosure provides further support for an electric motor including a wet clutch comprising a plurality of friction plates coupled to a hub, a one-way clutch integrally arranged within the wet clutch between the hub and an input gear, the input gear configured to receive power from the electric motor, and a shaft on which the wet clutch is arranged, wherein the shaft comprises a plurality of lubricant passages, wherein at least one of the plurality of lubricant passages comprises a plurality of openings for directing lubricant into the wet clutch. A first example of the electric motor further includes where the plurality of lubricant passages includes a central passage sealed from the wet clutch. A second example of the electric motor, optionally including the first example, further includes where the plurality of lubricant passages includes a first passage and a second passage fluidly coupled to a piston chamber of the wet clutch. A third example of the electric motor, optionally including one or more of the previous examples, further includes where the first passage directs lubricant toward a chamber surface and the second passage directs lubricant toward an interior volume of the piston chamber. A fourth example of the electric motor, optionally including one or more of the previous examples, further includes where the second passage is further fluidly coupled to the hub and the input gear. A fifth example of the electric motor, optionally including one or more of the previous examples, further includes where the input gear is decoupled from the hub, via the one-way clutch, when the input gear is rotating in a first direction. A sixth example of the electric motor, optionally including one or more of the previous examples, further includes where the input gear is coupled to the hub, via the one-way clutch, when the input gear is rotating in a second direction, the second direction opposite the first direction. A seventh example of the electric motor, optionally including one or more of the previous examples, further includes where the input gear and the hub sandwich the one-way clutch.

The disclosure provides additional support for a system including an electric motor, a transmission coupled to the electric motor, and a wet clutch coupled to the transmission via a gear, the wet clutch configured to couple to a drum of a shaft via a plurality of separator plates and a plurality of friction plates pressed together based on a force of fluid applied to a piston of the wet clutch, further comprising a one-way clutch arranged between the gear and a hub of the wet clutch, wherein the hub is physically coupled to the plurality of friction plates, wherein the shaft comprises a plurality of lubricant passages configured to lubricant the shaft and portions of the wet clutch. A first example of the system further includes where each of the plurality of lubricant passages is different in length. A second example of the system, optionally including the first example, further includes where each of the plurality of lubricant passages comprises a different number of openings for directing lubricant radially outward. A third example of the system, optionally including one or more of the previous examples, further includes where the gear comprises a gear arm that extends toward the hub and is coupled to an outer diameter of the one-way clutch, and wherein the hub comprises a hub arm that extends toward the gear and is coupled to an inner diameter of the one-way clutch. A fourth example of the system, optionally including one or more of the previous examples, further includes where an outer diameter of the hub is radially equidistant to the shaft as the gear arm.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A wet clutch for an electric motor, comprising:
   a plurality of friction plates coupled to a hub;
   a plurality of separator plates coupled to a drum and interleaved with the plurality of friction plates;
   a gear coupled to an output of the electric motor; and
   a one-way clutch integrally arranged in the wet clutch between the gear and the hub,
   wherein the wet clutch is arranged on a shaft, the shaft comprising a plurality of fluid passages including a central passage sealed from the wet clutch.

2. The wet clutch of claim 1, wherein the shaft further comprises a first outer passage fluidly coupled to a piston chamber of the wet clutch, and a second outer passage fluidly coupled to the piston chamber, the hub, an extension of the hub, and the gear.

3. The wet clutch of claim 2, wherein the extension of the hub is arranged between the one-way clutch and the shaft.

4. The wet clutch of claim 1, wherein a first bearing and a second bearing are arranged between the gear and a shaft on which the wet clutch is arranged.

5. The wet clutch of claim 1, wherein the one-way clutch opens and closes based on a direction of rotation of the gear to adjust a coupling between the gear and the hub.

6. The wet clutch of claim 1, wherein the one-way clutch is coupled to an inner diameter of the gear and an outer diameter of the hub.

7. A system, comprising:
   a electric motor;
   a wet clutch comprising a plurality of friction plates coupled to a hub;
   a one-way clutch integrally arranged within the wet clutch between the hub and an input gear, the input gear configured to receive power from the electric motor; and
   a shaft on which the wet clutch is arranged, wherein the shaft comprises a plurality of lubricant passages, wherein at least one of the plurality of lubricant passages comprises a plurality of openings for directing lubricant into the wet clutch, wherein the plurality of lubricant passages includes a central passage sealed from the wet clutch.

8. The system of claim 7, wherein the plurality of lubricant passages includes a first passage and a second passage fluidly coupled to a piston chamber of the wet clutch.

9. The system of claim 8, wherein the first passage directs lubricant toward a chamber surface and the second passage directs lubricant toward an interior volume of the piston chamber.

10. The system of claim 8, wherein the second passage is further fluidly coupled to the hub and the input gear.

11. The system of claim 7, wherein the input gear is decoupled from the hub, via the one-way clutch, when the input gear is rotating in a first direction.

12. The system of claim 11, wherein the input gear is coupled to the hub, via the one-way clutch, when the input gear is rotating in a second direction, the second direction opposite the first direction.

13. The system of claim 7, wherein the input gear and the hub sandwich the one-way clutch.

14. A system, comprising:
    an electric motor;

a transmission coupled to the electric motor; and a wet clutch coupled to the transmission via a gear, the wet clutch configured to couple to a drum of a shaft via a plurality of separator plates and a plurality of friction plates pressed together based on a force of fluid applied to a piston of the wet clutch, further comprising a one-way clutch arranged between the gear and a hub of the wet clutch, wherein the hub is physically coupled to the plurality of friction plates; wherein the shaft comprises a plurality of lubricant passages configured to lubricant the shaft and portions of the wet clutch, wherein the plurality of lubricant passages includes a central passage sealed from the wet clutch.

15. The system of claim 14, wherein each of the plurality of lubricant passages is different in length.

16. The system of claim 14, wherein each of the plurality of lubricant passages comprises a different number of openings for directing lubricant radially outward.

17. The system of claim 14, wherein the gear comprises a gear arm that extends toward the hub and is coupled to an outer diameter of the one-way clutch, and wherein the hub comprises a hub arm that extends toward the gear and is coupled to an inner diameter of the one-way clutch.

18. The system of claim 17, wherein an outer diameter of the hub is radially equidistant to the shaft as the gear arm.

\* \* \* \* \*